Dec. 6, 1927.
G. BELLUZZO
1,651,503
BLADE OF INTERNAL COMBUSTION TURBINE
Filed Aug. 17, 1922
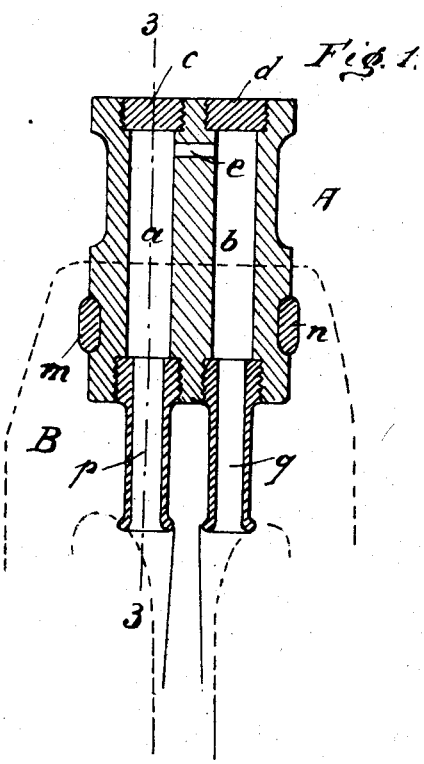
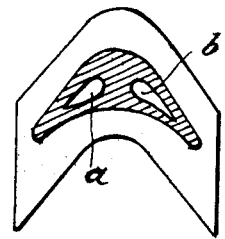
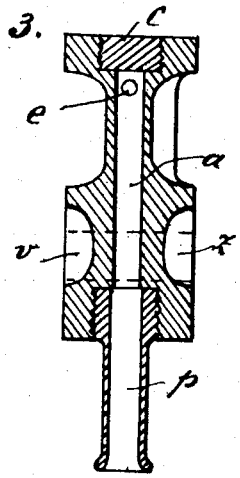
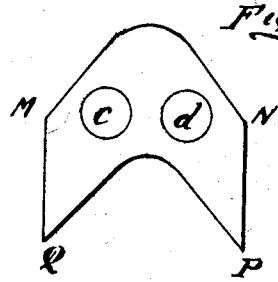
Inventor
Guiseppe Belluzzo.
per
Attorney.

Patented Dec 6, 1927.

1,651,503

UNITED STATES PATENT OFFICE.

GIUSEPPE BELLUZZO, OF MILAN, ITALY.

BLADE OF INTERNAL-COMBUSTION TURBINES.

Application filed August 17, 1922, Serial No. 582,571, and in Italy September 26, 1921.

According to this invention the blade in question for internal combustion turbines has the object of allowing of the rational and continuous circulation of water through the blades of an internal combustion turbine, in order to maintain their maximum temperature low and tolerable.

On the accompanying drawing Fig. 1 is a longitudinal section of a blade on a plane passing through the axis of the wheel on which it is mounted.

Fig. 2 shows the same blade in section on a horizontal plane.

Fig. 3 shows a longitudinal section of the blade, taken through 3—3 of Fig. 1, coinciding with one of the ducts.

Fig. 4 shows the blade seen from above.

Two ducts —a— and —b— go through the blade, the limiting surfaces of same following the shape of the concave and convex surface of the blades. with the object of giving the latter such thicknesses as will allow of sure cooling of the surfaces which are subjected to the passage of the hot gases.

These ducts, which go through the blade for the whole of its length, are closed at one end by two cylindrical caps —c— and —d—, screwed into the wall of the blade. The two ducts —a— and —b— communicate with each other by means of a hole —e— made in the blade—in the partition separating the ducts.

At the bottom of the blade there are two cylindrical holes, identical to those containing the caps —c— and —d—, and in same two small tubes —p— and —q— are fixed, same being placed at the proper distance on the crown B of the disc to which the blades are attached. These small tubes are, screwed into the holes in the blade and are then reamed to ensure tightness in the crown of the disc, after the blade has been rigidly fixed to the crown of the disc by means of the wedges —m— and —n—.

In Fig. 3, which represents a cross section of the blade, taken through one of the ducts, in addition to the duct —a— there are to be seen the closing tap —c—, the holes —e— communicating with the duct —b—, and the small tube —p—; also the sockets —v— and —z— which are made on the back and on the concave surface of the larger curve of the blade, in the part which remains set in the disc B.

In Fig. 4 the blade is seen from above, as also the profile of the blade, having the shape represented by the lines M N P Q.

Having now particularly described and ascertained my invention and in what manner the same is to be performed, I declare that what I claim is:

1. In an internal combustion turbine, a blade provided with two ducts for cooling liquid, a passage in the blade connecting the ducts, means for securing the blade in the crown of a disc of the turbine, the crown being provided with a conduit communicating with each of the said ducts at an end thereof, and a removable plug in the other end of each of said ducts.

2. The structure recited in claim 1 wherein the plugs have a diameter greater than the maximum cross-sectional dimension of the ducts, and a seat for each plug at the corresponding end of the duct to ensure against leakage of the cooling liquid.

3. The structure recited in claim 1 wherein each duct is provided at its end opposite that closed with a plug with a tube communicating with the respective conduit in the crown, each tube being flared at the end thereof communicating with a crown conduit to ensure a tight fit therewith.

Signed at Milan, Italy, this 21st day of July 1922.

GIUSEPPE BELLUZZO.